United States Patent
Osipov et al.

(10) Patent No.: US 7,106,494 B2
(45) Date of Patent: Sep. 12, 2006

(54) CONTROLLING RESONANT CELLS OF A COMPOSITE MATERIAL

(75) Inventors: Viatcheslav V. Osipov, Mountain View, CA (US); Alexandre Bratkovski, Mountain View, CA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 106 days.

(21) Appl. No.: 11/035,625

(22) Filed: Jan. 14, 2005

(65) Prior Publication Data

US 2006/0109541 A1 May 25, 2006

Related U.S. Application Data

(63) Continuation-in-part of application No. 10/993,616, filed on Nov. 19, 2004.

(51) Int. Cl.
*G02F 1/29* (2006.01)
*G02F 1/00* (2006.01)
*H01F 7/06* (2006.01)

(52) U.S. Cl. .................. 359/299; 359/321; 29/602.1; 29/417; 372/20; 372/28; 257/17; 257/21; 257/79; 257/622; 356/445; 430/2

(58) Field of Classification Search ................ 359/299, 359/310, 321, 248, 342, 344, 345, 237, 238; 29/602.1, 417, 846; 372/20, 28, 44.011, 372/50.1, 55; 257/17, 21, 79, 417, 622; 356/445, 356/317; 430/2, 321; 250/306

See application file for complete search history.

(56) References Cited

U.S. PATENT DOCUMENTS

| 3,504,302 | A | * | 3/1970 | Fenner | 372/28 |
| 5,323,019 | A | * | 6/1994 | Dutta et al. | 257/17 |
| 5,327,225 | A | * | 7/1994 | Bender et al. | 356/445 |
| 6,180,288 | B1 | * | 1/2001 | Everhart et al. | 430/2 |
| 6,665,111 | B1 | * | 12/2003 | Sundaram | 359/299 |
| 6,938,325 | B1 | * | 9/2005 | Tanielian | 29/602.1 |

* cited by examiner

*Primary Examiner*—Lohn Ben

(57) ABSTRACT

An apparatus for controlling propagation of incident electromagnetic radiation is described, comprising a composite material having electromagnetically reactive cells of small dimension relative to a wavelength of the incident electromagnetic radiation. Each electromagnetically reactive cell comprises a metallic element and a substrate. An electron population within the substrate near the metallic element of at least one of the electromagnetically reactive cells is temporally controllable to allow temporal control of an associated effective refractive index encountered by the incident electromagnetic radiation while propagating through said composite material.

33 Claims, 6 Drawing Sheets

CONTROLLING RESONANT CELLS OF A COMPOSITE MATERIAL

CROSS-REFERENCE TO RELATED APPLICATIONS

This application is a continuation-in-part of the commonly assigned U.S. Ser. No. 10/993,616, filed Nov. 19, 2004, which is incorporated by reference herein.

FIELD

This patent specification relates generally to controlling electromagnetic propagation for optical modulation, optical switching, or any of a variety of other useful purposes.

BACKGROUND

Devices for temporal control of the propagation of electromagnetic radiation represent fundamental building blocks for many modern technologies. Where a single spatial dimension is involved, such as in the propagation of a fiber optic communications signal down an optical fiber, such control is commonly achieved by devices affecting the amplitude of the propagating light (e.g., OFF/ON). In that environment, one-dimensional electrooptical modulators are often used that are based on electrooptic and/or magnetooptic materials such as calcite, quartz, and lithium niobate that change their refractive index responsive to applied control signals, the materials being arranged into Mach-Zehnder interferometers (MZIs) or similar devices converting induced phase changes into amplitude changes by interference effects. Other one-dimensional electrooptical modulators include electroabsorption modulators variably absorbing the incident signal according to an applied electric field, and acoustic wave modulators using high-frequency sound traveling within a crystal or a planar wave guide to deflect light from one place to another. Among other issues, such as limited power-handling ability, the above modulators each have substantial bandwidth limitations, e.g., practical limits to the speed at which they can vary the output signal between ON and OFF. By way of example, the maximum bit rate of many of the above electrooptic/magnetooptic effect modulators, as well as many of the above electroabsorption modulators, is on the order of 10–40 GHz, while many acoustic wave modulators have an even lower maximum bit rate.

Where two spatial dimensions are involved, e.g., in the controlled propagation of electromagnetic wavefronts in imaging systems, devices for temporal control of the propagating radiation include liquid crystal-based spatial light modulators (SLMs) and microelectromechanical (MEMs)-based SLMs, each generally providing for pixelwise amplitude or phase modulation of the propagating radiation. Among other issues, each of these SLM types has substantial bandwidth limitations. Although some liquid-crystal SLMs may use optical control signals rather than electrical control signals, pixel response times are nevertheless on the order of microseconds (binary) or milliseconds (analog). Typical response times for so-called digital micromirror devices, one type of commercially available MEMs SLM, are on the order of microseconds. Other issues relating to the above devices for one- or two-dimensional control of propagating radiation include power consumption, power handling ability, size, and environmental considerations.

Accordingly, in relation to at least one of the above one-dimensional and two-dimensional contexts, it would be desirable to control the propagation of electromagnetic radiation in a manner that at least partially resolves one or more of the above issues. It would be further desirable to provide one or more useful devices based on such control capabilities.

SUMMARY

In accordance with an embodiment, an apparatus is provided for controlling propagation of incident electromagnetic radiation, comprising a composite material having electromagnetically reactive cells of small dimension relative to a wavelength of the incident electromagnetic radiation. Each electromagnetically reactive cell comprises a metallic element and a substrate. An electron population within the substrate near the metallic element of at least one of the electromagnetically reactive cells is temporally controllable to allow temporal control of an associated effective refractive index encountered by the incident electromagnetic radiation while propagating through the composite material.

Also provided is a method for controlling propagation of incident electromagnetic radiation, comprising placing a composite material in the path of the incident electromagnetic radiation, the composite material comprising resonant cells of small dimension relative to a wavelength of the incident electromagnetic radiation, each resonant cell comprising a metallic element and a substrate. The method further comprises temporally controlling an electron population within the substrate near the metallic element of at least one of the resonant cells to temporally control an associated effective refractive index encountered by the incident electromagnetic radiation while propagating through the composite material.

Also provided is an apparatus comprising a composite material, the composite material comprising an array of electromagnetically reactive cells. Each electromagnetically reactive cell comprises a metal conductor disposed on a substrate. The apparatus further comprises means for applying incident radiation upon a surface of the composite material for propagation therethrough, the incident radiation having a wavelength substantially larger than a size of each of the electromagnetically reactive cells. The apparatus further comprises means for temporally controlling an electron population within the substrate near the metal conductor of at least one of the electromagnetically reactive cells to facilitate temporal control of an associated effective refractive index encountered by the incident radiation while propagating through the composite material.

DETAILED DESCRIPTION

Figure 1B:
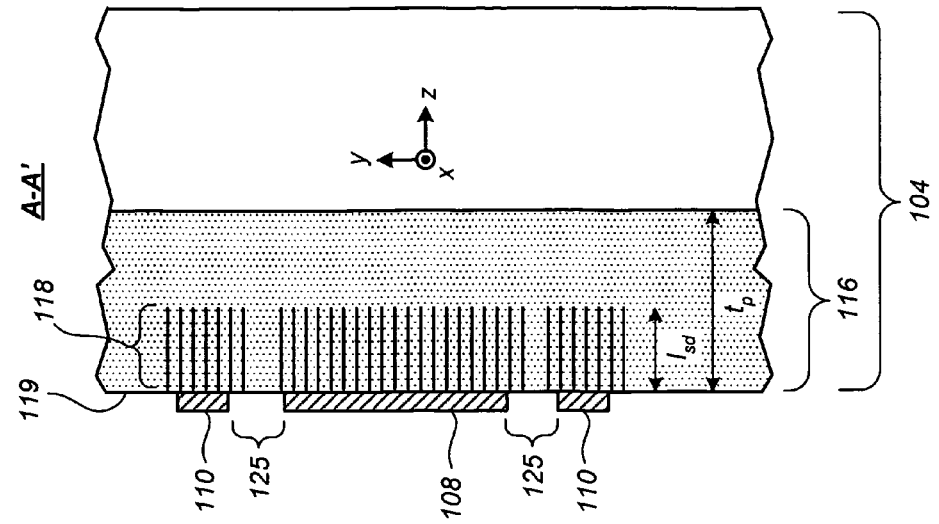
FIG. 1B illustrates a side cut-away view of a portion of the apparatus of FIG. 1A.
Figure 1A:
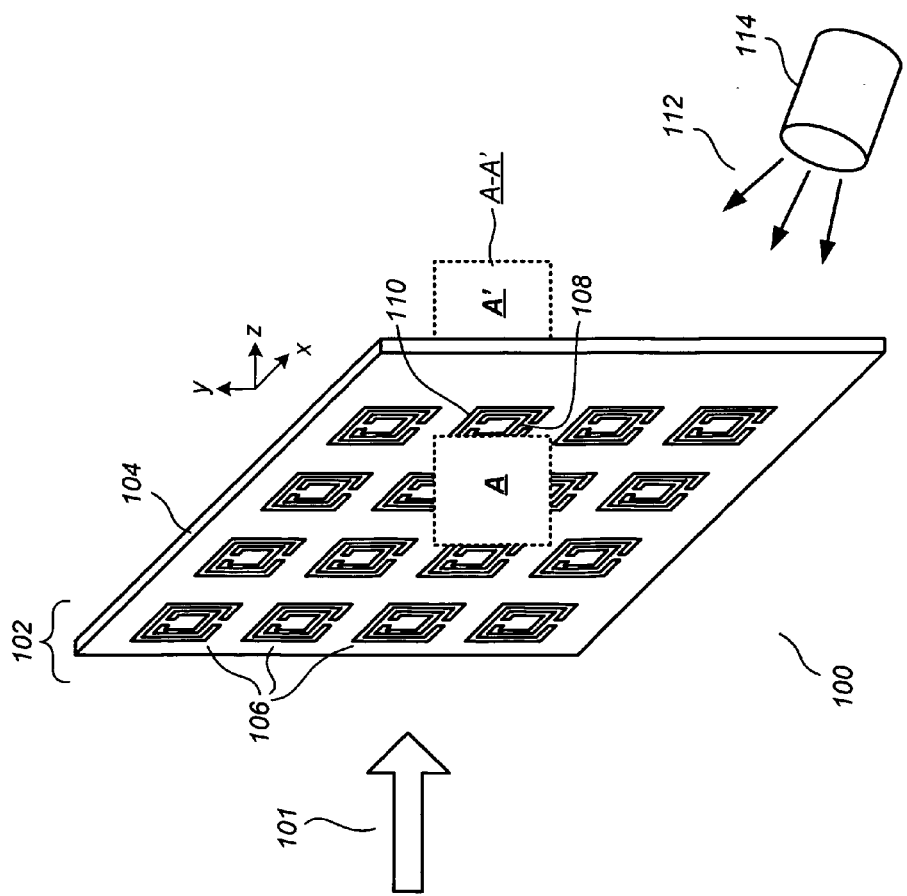
FIG. 1A illustrates an apparatus for controlling the propagation of incident electromagnetic radiation according to an embodiment.

FIG. 1A illustrates an apparatus 100 for controlling the propagation of incident electromagnetic radiation 101 according to an embodiment, comprising a composite material 102. The composite material 102 comprises a substrate 104 onto which an array of electromagnetically reactive or resonant cells 106 is formed. For simplicity and clarity of presentation, an apparatus having only a single array comprising a single substrate 104 is illustrated in FIG. 1A and herein. However, it is to be appreciated that in other embodiments there may be a plurality of such arrays placed in series relative to the path of the incident radiation 101, each array being on its own substrate. Apparatus 100 further comprises an input optical system (not shown) for receiving the incident electromagnetic radiation from a source and applying it to the composite material 102. For clarity of presentation, it may be assumed that the incident electromagnetic radiation 101 propagates in the left-to-right direction in FIG. 1A (i.e., the +z direction), although the scope of the present teachings is not so limited. Apparatus 100 further comprises an output optical system (not shown) receiving the incident electromagnetic radiation after propagating through the composite material 102, that radiation emerging as a temporally varying one-dimensional or two-dimensional output signal according to the desired functionality.

Apparatus 100 further comprises a control radiation input system 114 providing control radiation 112 to the substrate 104. It is to be appreciated that the control radiation input system 114 may take on a variety of different forms capable of introducing spatially uniform or spatially varying control radiation onto the substrate 104. For example, in one embodiment, the control radiation input system 114 may be configured to bathe the substrate 104 with a temporally varying, but spatially uniform control beam. In another embodiment, the control radiation input system 114 may be configured to apply control radiation across the substrate 104 according to a temporally-varying, spatially-varying modulation intensity pattern. As used herein, the terms signal radiation, signal light, and/or signal beam may be used to refer to the incident electromagnetic radiation 101 that is introduced into the composite material 102 for propagation therethrough. As used herein, the terms control radiation, control light, and/or control beam may be used to refer to that radiation (such as control radiation 112) that affects one or more properties of the composite material so as to influence the way the incident electromagnetic radiation 101 propagates therethrough. As used herein, the terms output radiation, output light, and/or output beam may be used to refer to the radiation that emerges from the composite material 102 after propagation therethrough.

Although propagation of optical signals (e.g., infrared, visible, ultraviolet) is discussed herein, it is to be appreciated that the scope of the present teachings is not limited to optical signals, but rather can include any type of electromagnetic radiation, ranging from radio frequency radiation and microwaves to x-ray radiation, that can be introduced into a composite material and received or collected after propagating through the composite material. Notably, although presented in terms of examples in which radiation propagates into a composite material from one end and emerges from the other end (e.g., left to right on the drawing pages), propagation as used herein can also refer to reflective cases in which radiation propagates into a composite material from one end and emerges from that same end.

The resonant cells 106 of composite material 102 are preferably of small dimension (e.g., 20 percent or less) compared to a wavelength of the incident electromagnetic radiation 101. Unless indicated otherwise, radiation characterized herein by a stated wavelength is presented in terms of a free-space wavelength, with a frequency of that radiation being equal to the free-space speed of light divided by the stated wavelength. Although the individual response of any particular resonant cell 106 to an incident wavefront can be quite complicated, the aggregate response the resonant cells 106 can be described macroscopically, as if the composite material 102 were a continuous material, except that the permeability term is replaced by an effective permeability and the permittivity term is replaced by an effective permittivity. Accordingly, the term artificial material or metamaterial can sometimes be used to refer to the composite material 102.

In the particular example of FIG. 1A, each resonant cell 106 comprises a solenoidal resonator that includes a pattern of conducting material having both capacitive and inductive properties. Preferably, the conducting material is metallic. In the particular example of FIG. 1A, the conducting material is formed into square split ring resonator patterns including inner metallic elements 108 and outer metallic elements 110. However, other patterns can alternatively be used, such as circular split ring resonator patterns, swiss roll patterns, helical wire structures, or other patterns exhibiting analogous properties. By way of example and not by way of limitation, the incident electromagnetic radiation 101 may be at a wavelength of 1.55 μm, in which case the resonant cell dimension should be less than about 300 nm, with better performance being exhibited where that dimension is about 150 nm or less.

The composite material 102 is generally amenable to fabrication using photolithographic techniques and/or nanoimprint lithography techniques. Although many different sizes are possible, the composite material 102 can comprise a square 1 K×1 K array of resonant elements 106 occupying an area of about 0.3 mm×0.3 mm. The material for the substrate 104 should be substantially non-absorbing for light at the wavelength of the incident electromagnetic radiation 101. For example, a substrate material comprising GaAs or Si, each having a bandgap energy corresponding to a photon wavelength below 1 μm, can be suitable for an incident radiation wavelength of 1.55 μm, although the scope of the present teachings is not so limited.

One salient feature of the split-ring resonator pattern of each resonant cell 106, or analogous structures according to the present teachings, is that it brings about an inductive property and a capacitive property that can interact to cause a resonance condition in the presence of electromagnetic radiation at particular frequencies. Generally speaking, when the resonant cells 106 are placed in regular arrayed arrangements such as those of FIG. 1A, this resonance condition is associated with a capability of neighborhoods of the resonant cells 106 to exhibit negative effective permeability and/or negative effective permittivity. The composite material 102, or a neighborhood of resonant cells 106 therein, is said to have a negative effective refractive index when the effective permeability and effective permittivity are simultaneously negative. In one embodiment, the composite material 102 is formed into a so-called "superlens" capable of imaging with very high resolutions, even exceeding the diffraction limitations of positive-index optical devices.

According to an embodiment, at least one property associated with a resonance condition of one or more of the resonant cells 106 is temporally controlled to achieve temporal control of the effective refractive index in the neighborhood of the controlled cells. The resonance condition can be altered or destroyed by even modest variations in the capacitive, inductive, and/or resistive properties associated with the conductive element(s) of the resonant cell. As described in Ser. No. 10/993,616, supra, one way to vary at least one property associated with the resonance condition is to vary carrier populations in the resonant cell by introducing control radiation into the substrate, the control radiation having a frequency higher than a bandgap radiation frequency of the substrate material. Absorption of control radiation photons releases the carriers in the substrate. In contrast, the incident signal radiation is generally not absorbed by the substrate because its frequency below the bandgap radiation frequency. Accordingly, propagation of the incident signal radiation is controlled by the control radiation through variations in the effective refractive index of the composite material.

It has been found particularly effective to vary an electron population of the substrate 104, rather than a hole population of the substrate 104, in the vicinity of the metallic elements 108/110. More particularly, it has been found particularly effective to corral photoabsorptively-created electrons (photoelectrons) near the metallic elements 108/110 using an electric field associated with a Schottky depletion region, the Schottky depletion region arising out of a metal-semiconductor or metal-insulator-semiconductor junction between the metallic elements 108/110 and a positively doped portion of the substrate 104. It is preferable to aggregate electrons, rather than holes, near the metallic elements 108/110 because holes are more likely to recombine with electrons in the metal and be depleted, thereby limiting their ability to aggregate in great numbers. In contrast, electrons corralled near the boundary will not be depleted by the electrons in the metal, and therefore will tend to aggregate in greater numbers. Where the substrate 104 is positively doped in the vicinity of the metal-semiconductor boundary, the electron aggregation is further encouraged because the electric field associated with the Schottky depletion region urges electrons toward the boundary. The aggregated electrons affect at least one of a capacitive, inductive, or resistive characteristic of the resonant cell 106 sufficient to alter the resonance condition. By way of electrical-circuit analogy, it can be readily seen how a high population of electrons in the vicinity of the metallic elements 108/110 could at least temporarily "short" them together, or could at least temporarily "short" each metallic element 108/110 across its respective split-ring gap.

FIG. 1B illustrates a side cut-away view of a portion of the apparatus of FIG. 1A as intersected by a hypothetical cut-plane A-A'. The substrate 104 comprises a positively doped semiconductor layer 116 having a thickness $t_p$. For those areas of the substrate 104 covered by the metallic elements 108/110, an interface 119 of the positively doped semiconductor layer 116 is in direct contact with those metallic elements 108/110, thereby forming metal-semiconductor junctions. For those areas, a Schottky depletion region 118 starts at the interface 119 and extends into the positively doped semiconductor layer 116 by a thickness of $l_{sd}$.

According to an embodiment, distances between the inner metallic element 108 and the outer metallic element 110, as well as distances across the split-ring gaps of each of them, are smaller than or comparable to the thickness $l_{sd}$ of the Schottky depletion region 118. In one example, in an embodiment in which the resonant cell dimension is on the order of 300 nm, the metallic elements 108/110 may have line widths of roughly 30 nm, may be radially separated from each other by roughly 70 nm, and may have split-ring gaps of roughly 70 nm. In this example, the materials and doping concentration for the positively doped semiconductor layer 116 are selected such that the thickness $l_{sd}$ of the Schottky depletion region 118 is roughly 100 nm–1000 nm. Accordingly, when photoelectrons aggregate near the metallic elements 108/110 along the interface 119 responsive to application of control radiation, an appreciable number of them will also diffuse into the inter-metal gap areas 125 illustrated in FIG. 1B, thereby facilitating alteration of the resonance condition and therefore the effective index of refraction. It is to be appreciated that the above dimensions are presented only by way of example to illustrate the features and advantages of the embodiments, and are not presented by way of limitation.

Notably, the resonance condition could also be substantially affected even if electron diffusion into the inter-metal gaps 125 was relatively small. Again by way of electrical-circuit analogy, one could see how the aggregation of electrons along the entire lengths of the metallic elements 108/110 could respond in "parallel" with the metal's own electrons responsive to incident electromagnetic/electromotive forces.

In one embodiment, the thickness $t_p$ lies in a range between the thickness $l_{sd}$ of the Schottky depletion region and an electron diffusion length L within the p-doped semiconductor material 116. Typical values for the electron diffusion length L are in the range of 1 μm–10 μm. In another embodiment, the thickness $t_p$ of the positively-doped semiconductor layer 116 at least roughly corresponds to an absorption length of the control radiation therein.

Figure 2:
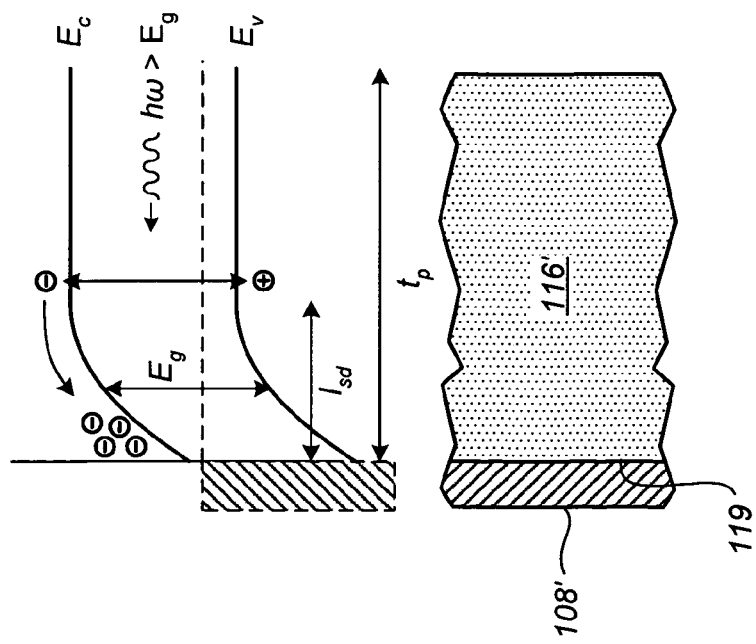
FIG. 2 illustrates a side cut-away view of a portion of a resonant cell according to an embodiment and an associated energy band diagram.

FIG. 2 illustrates a side cut-away view of a portion of a resonant cell according to an embodiment and an associated energy band diagram, along a portion 108' of the metallic element 108 and a portion 116' of the positively-doped semiconductor layer 116'. In one embodiment, the layer 116 can be p-doped with an acceptor concentration less than about $10^{17}$ acceptors/cm$^3$, although the scope of the present teachings is not so limited. In another embodiment, the layer 116' is p-doped to an amount sufficient to cause a barrier potential (i.e. the amount by which the top of the valence band $E_v$, and the bottom of the conduction band $E_c$ are raised when brought into contact with the metal) of about 0.5–0.7 eV. The metallic elements 108' can comprise any of a variety of different metals and/or their alloys including, but not limited to, iron, silver, aluminum, and gold. The substrate 104 can comprise any of a variety of semiconductors having a bandgap radiation frequency (i.e., the frequency of a photon having an energy corresponding to the semiconductor's bandgap $E_g$) above the incident radiation frequency and below the control radiation frequency.

By way of example and not by way of limitation, a GaAs semiconductor as may be used for the substrate 104 may have a bandgap energy $E_g$ of about 1.43 eV. This corresponds to a bandgap radiation frequency corresponding to a wavelength of 867 nm. The control radiation should be at a frequency higher than the bandgap radiation frequency, i.e., at a wavelength less than 867 nm. The incident signal radiation should be at a frequency lower than the bandgap radiation frequency, i.e., at a wavelength greater than 867 nm. The energy band diagram of FIG. 2 conceptually illustrates the absorption of a control radiation photon having an energy $h\omega > E_g$, with the created photoelectron diffusing toward the interface 119.

Figure 4:
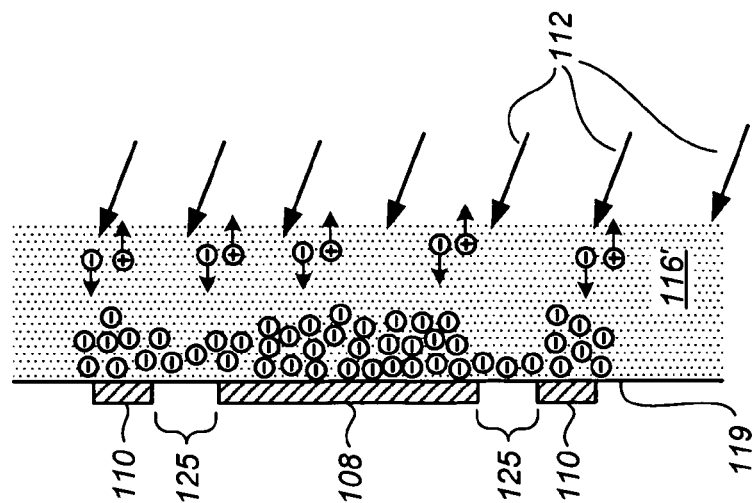
FIG. 4 illustrates a conceptual example of an electron population near a metallic element of a resonant cell according to an embodiment when control radiation is applied.
Figure 3:
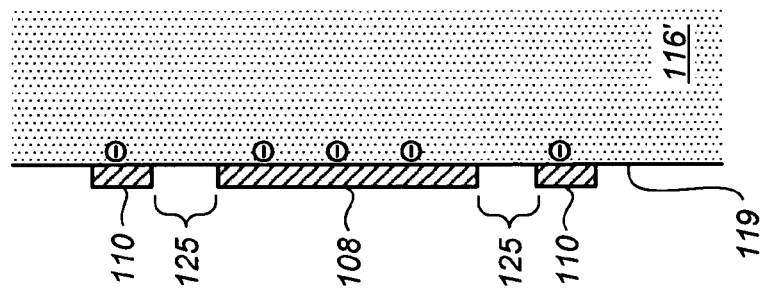
FIG. 3 illustrates a conceptual example of an electron population near a metallic element of a resonant cell according to an embodiment when control radiation is not applied.

FIG. 3 illustrates a conceptual example of an electron population along the interface 119 when no control radiation is applied. FIG. 4 conceptually illustrates the electron population along the interface 119 when control radiation 112 is applied. As illustrated, photoelectrons diffuse toward the interface 119 for those areas near the metallic elements 108/110. Also, because the inter-metal gap areas 125 are smaller than or comparable to the thickness of the Schottky depletion layer, the electrons also diffuse in appreciable numbers into those areas. Alteration of the resonance condition and therefore the effective index of refraction is thereby achieved.

Control of the effective refractive index can be both spatial and temporal, and can be either binary (ON/OFF) or continuous. Therefore, a wide variety of useful devices can be achieved in accordance with the present teachings, including one-dimensional optical modulators and two-dimensional spatial light modulators. Spatiotemporal control of the signal beam is primarily in the form of phase changes induced on the wavefronts incident to the composite material.

Advantageously, the rises and falls in the electron population along the interface 119 responsive to changes in the control radiation 112 can be very fast, allowing for very fast temporal control of the effective refractive index of the composite material 102, whether it be on a spatially varying basis or uniformly across the surface as a whole. Very fast modulation rates are therefore possible, even on the order of 100 GHz where the electron population rise and fall times are on the order of picoseconds.

Figure 5:
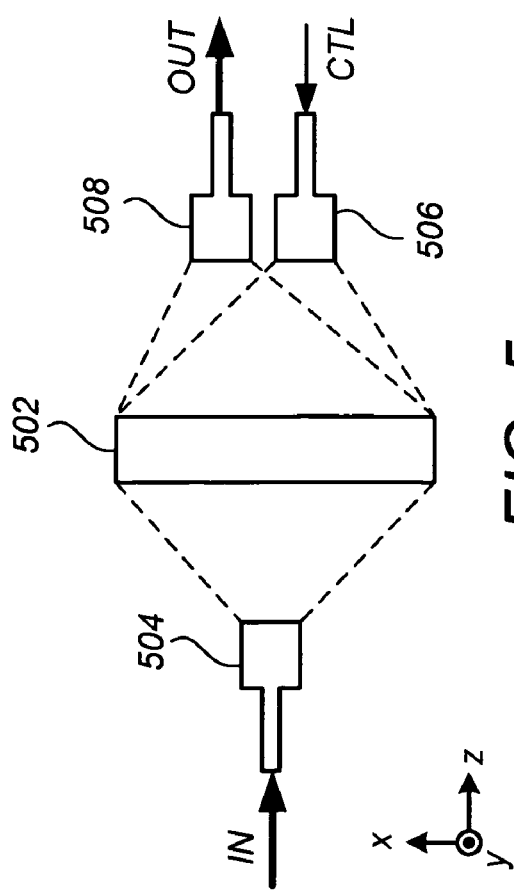
FIG. 5 illustrates a top view of a device for controlling the propagation of incident electromagnetic radiation according to an embodiment.

FIG. 5 illustrates an apparatus for controlling the propagation of incident electromagnetic radiation according to an embodiment, wherein the apparatus can achieve optical transistor functionality. A composite material 502 similar to the composite material 102 of FIGS. 1A–1B is provided. A signal beam IN, which may be derived from an optical fiber in a telecommunications system, for example, is applied to a front receiving surface of the composite material 502 using a signal input optical system 504. A control beam CTL is applied from the opposite side onto a p-doped semiconductor layer (not shown) of the composite material 502 using a control input optical system 506. The control input optical system 506 is configured to cause the control beam to impinge upon the composite material 502 according to an intensity pattern that causes the signal beam to be imaged onto an output optical system 508 by varying amounts according to a desired temporal modulation scheme, to generate an output signal OUT.

Figure 6:
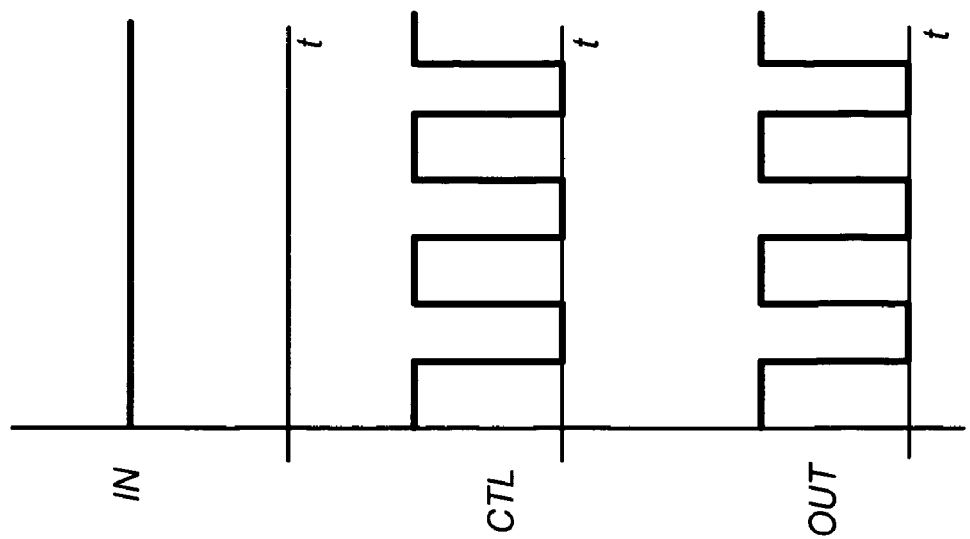
FIGS. 6–8 illustrate signal waveforms associated with the apparatus of FIG. 5 according to one or more embodiments.

In one embodiment yielding waveforms similar to those of FIG. 6, the amplitude of the control beam is modulated between a (i) first value (ON) that causes the composite material 502 to properly focus the signal beam onto the output optical system 508 according to a "superlensing" capability, and (ii) a second value (OFF) that causes the composite material 502 not to properly focus the signal beam onto the output optical system 508. Notably, any of a variety of different effective refractive index values and profiles can achieve the OFF state, such as defocusing or redirection. In one embodiment, the OFF state is achieved by quickly and completely destroying the resonance conditions needed for negative effective refractive index across the entire composite material 502, and then the ON state is achieved by restoring the resonance condition just as quickly.

Signal input optical system 504, control input optical system 506, and output optical system 508 comprise positive-index imaging systems capable of achieving the functionalities described herein. The input optical system 504 can comprise an imaging lens that images the signal beam IN onto a front surface of the composite material 502. The output optical system 508 can comprise any of a variety of optical systems designed to collect and guide the output beam. Advantageously, in accordance with a "superlensing" capability of the composite material 502, the optical systems 504, 506, and 508 may be separated from the front and back surfaces of the composite material 502 by very short distances, e.g., on the order of 10–500 μm. Moreover, the numerical aperture requirements are very modest, and therefore low-cost light collection devices can be used in the output optical system 508.

Figure 8:
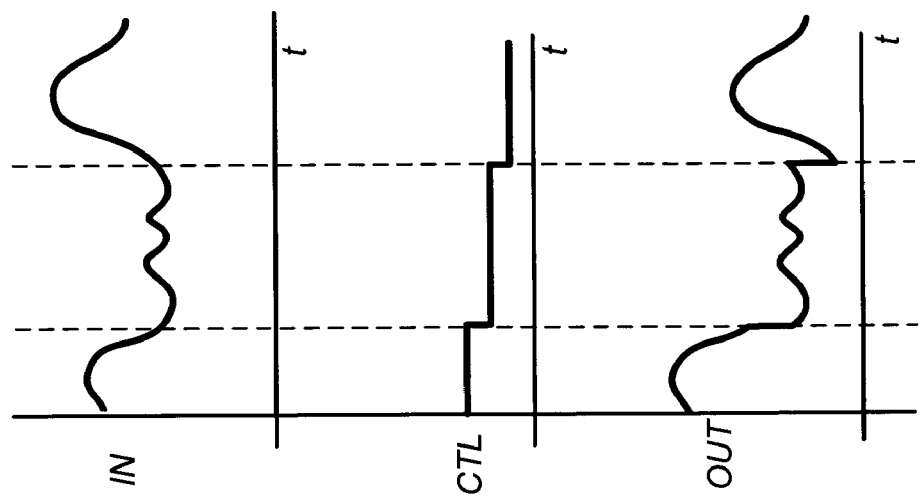
Figure 7:
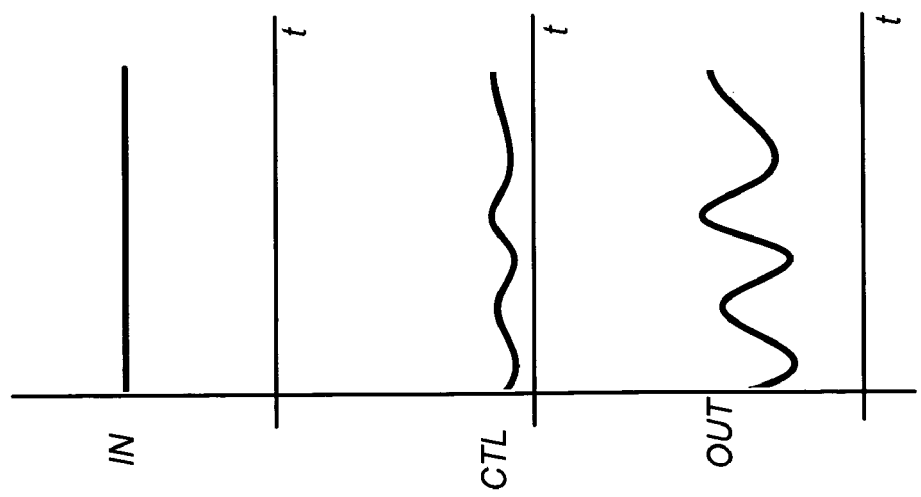

Practical uses for ON/OFF modulation of a constant-level signal beam, as shown in the waveforms illustrated in FIG. 6, include optical gating and wavelength conversion. FIGS. 7 and 8 illustrate alternative signal waveforms that can be associated with the apparatus of FIG. 5 according to other embodiments. FIG. 7 illustrates analog modulation of a constant-level signal beam, effectively performing an analog amplification (and wavelength conversion) of the control beam. This analog implementation can be achieved using fine temporal variations of the control beam sufficiently precise to achieve small changes in the effective refractive index of the composite material 502. This can be contrasted with alternative embodiments in which negative effective index characteristics are entirely created and destroyed in a binary manner. FIG. 8 illustrates level control of an analog signal beam that can be similarly implemented with fine temporal variations of the control beam.

It is to be appreciated that the embodiment of FIG. 5 represents only one of the various ways that control light can be applied to the composite material according to the present teachings. The control light can be applied from the front, from the back, from sides, etc., without departing from the scope of the present teachings. When control light is applied from the front, it may be necessary to use an indirect angle to obviate "shadowing" of the p-doped semiconductor layer by the metallic elements.

Figure 9:
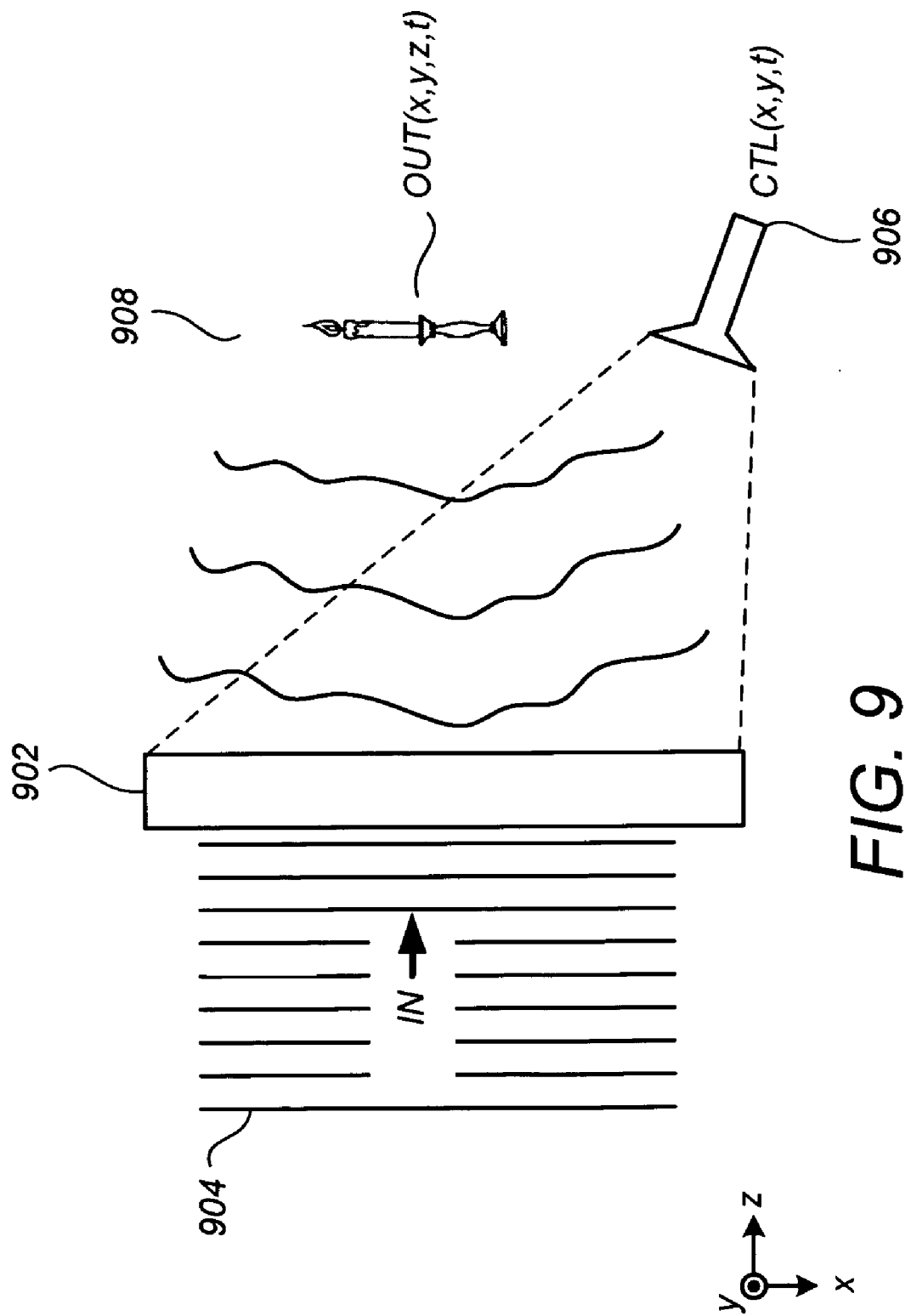
FIG. 9 illustrates an apparatus for controlling the propagation of incident electromagnetic radiation according to an embodiment.

FIG. 9 illustrates an apparatus for controlling the propagation of incident electromagnetic radiation in both a spatial and temporal manner, thereby achieving spatial light modulation functionality. A composite material 902 similar to the composite material 102 of FIGS. 1A–1B is provided. A control beam input system 906 images control light onto a p-doped semiconductor layer (not shown) of the composite material 902 according to a desired intensity pattern CTL(x,y,t) that causes a corresponding effective refractive index profile to be encountered by an incident signal beam 904 that, for purposes of illustration, is shown as a coherent plane wave. Upon propagation of the signal beam 904 through the composite material 902, it is imaged into a two-dimensional pattern OUT(x,y,t) and/or a desired three-dimensional real image OUT(x,y,z,t) 908 in a holographic manner, i.e., according to desired spatial distribution of phase changes induced at the composite material 902. Advantageously, very fast response times to changes in the control signal CTL(x,y,t) can be realized for very fast spatial light modulation. Many different devices for optics, imaging, and/or communications applications can be realized.

Figure 10:
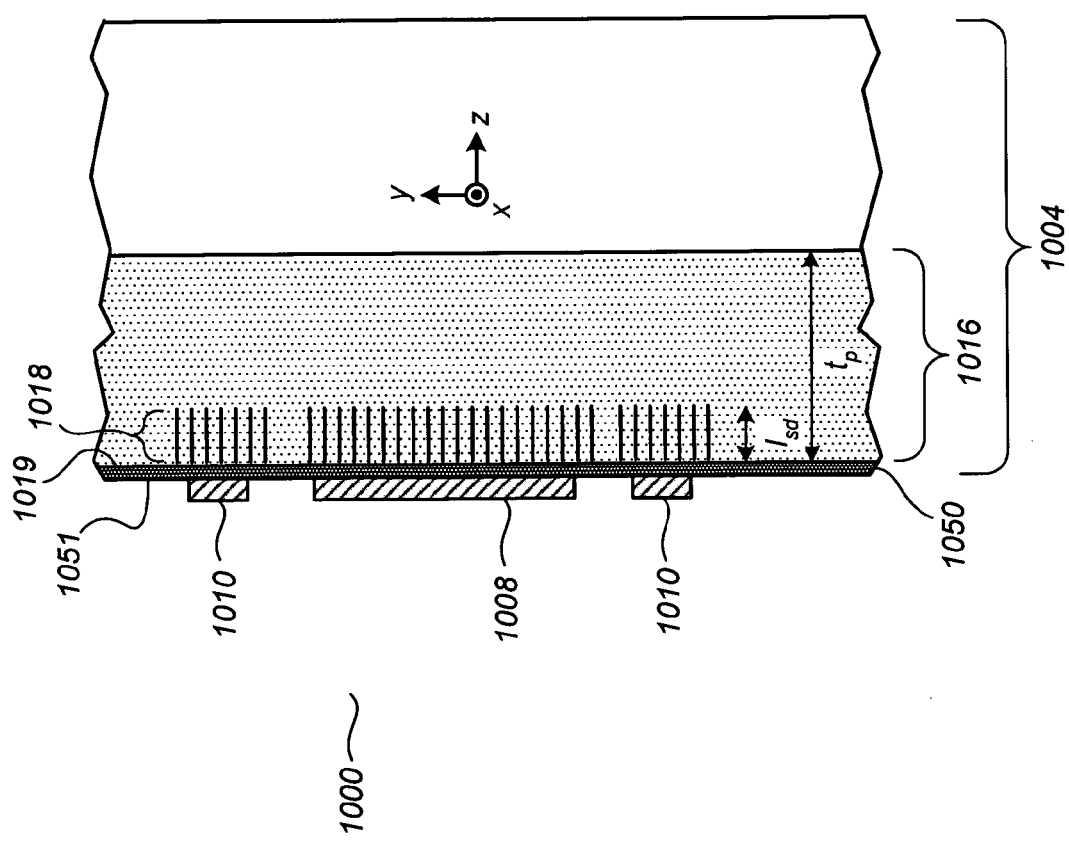
FIG. 10 illustrates a side cut-away view of a portion of a resonant cell of an apparatus for controlling the propagation of incident electromagnetic radiation according to an embodiment.

FIG. 10 illustrates a side cut-away view of a portion of a resonant cell of a composite material 1000 according to an embodiment. The composite material 1000 is similar to the composite material 102 of FIGS. 1A–1B, comprising a substrate 1004 that includes a p-doped semiconductor layer 1016 similar to the p-doped semiconductor layer 116, as well as metallic elements 1008/1010 similar to the metallic elements 108/110. However, the substrate 1004 further comprises a thin insulating layer 1050 disposed between the metallic elements 1008/1010 and an interface 1019 of the p-doped semiconductor layer 1016. The insulating layer 1050 contacts the metallic elements 1008/1010 at an outer interface 1051. In one embodiment in which the substrate 1004 comprises silicon, the insulating layer 1050 can comprise silicon dioxide and is approximately 1.5 nm thick. Generally speaking, the composite material 1000 operates in a manner analogous to the composite material 102 of FIGS. 1A–1B, with the exception that the Schottky depletion layer 1018 is associated with a metal-insulator-semiconductor junction rather than a metal-semiconductor junction. The composite material 1000 of FIG. 10 may provide an advantage relating to further inhibition of interactions between the photo-carriers (i.e., photoelectrons) and the metal, while still facilitating alteration of the resonance condition and therefore the effective refractive index.

Whereas many alterations and modifications of the embodiments will no doubt become apparent to a person of ordinary skill in the art after having read the foregoing description, it is to be understood that the particular embodiments shown and described by way of illustration are in no way intended to be considered limiting. By way of example, while some embodiments supra are described in the context of negative-index materials, the features and advantages of the embodiments are readily applicable in the context of other composite materials. Examples include so-called indefinite materials (see WO 2004/020186 A2) in which the permeability and permittivity are of opposite signs.

By way of further example, it is to be appreciated that the composite material 102 of FIG. 1A represents a simplified example for clarity of description, showing only a single planar array of resonant cells 106 aligned along a direction of propagation. In other embodiments, a plurality of such planar arrays can be provided along the direction of propagation. In still other embodiments, a second set of planar arrays can be provided perpendicular to the first set of planar arrays for facilitating negative effective permittivity and/or negative effective permeability for more directions of propagation. In still other embodiments, a third set of planar arrays can be provided perpendicular to both the first and second sets of planar arrays for facilitating negative effective permittivity and/or negative effective permeability for even more directions of propagation. It is to be further appreciated that one or more additional sets of composite and/or continuous-material planes can be placed between the planar arrays without departing from the scope of the present teachings. By way of example, planar arrays consisting of vertical conducting wires on a dielectric support structure can be interwoven with the above planar arrays to provide a more negative effective permittivity for the overall composite material. It is to be further appreciated that the number of resonant cells 106 on the planar arrays can be in the hundreds, thousands, or beyond depending on the overall desired dimensions and the desired operating wavelength.

By way of further example, the temporally controlled resonant cells can be implemented on only a portion of a larger composite material, or in association a subset of the possible directions of an anisotropic composite material, or interleaved in one or more directions with a continuous material as part of a larger composite material, without departing from the scope of the embodiments. By way of still further example, although devices according to the present teachings can provide for very fast temporal control, such control can of course be provided in a very slow manner to provide static devices having fixed control beams, and/or quasi-static devices having control beams that are altered very rarely, e.g. once every day, month, or year in a manner similar to the way flashable memory devices are controlled. Thus, reference to the details of the described embodiments are not intended to limit their scope.

What is claimed is:

1. An apparatus for controlling propagation of incident electromagnetic radiation, comprising a composite material having electromagnetically reactive cells of small dimension relative to a wavelength of the incident electromagnetic radiation, each electromagnetically reactive cell comprising a metallic element and a substrate, wherein an electron population within the substrate near the metallic element of at least one of said electromagnetically reactive cells is temporally controllable to allow temporal control of an associated effective refractive index encountered by the incident electromagnetic radiation while propagating through said composite material.

2. The apparatus of claim 1, said substrate comprising a positively doped semiconductor layer having an interface sufficiently close to said metallic element such that a depletion region is formed in association therewith.

3. The apparatus of claim 2, said positively doped semiconductor layer having a bandgap energy and a corresponding bandgap radiation frequency, said wavelength of said incident electromagnetic radiation corresponding to a first frequency below said bandgap radiation frequency, wherein said electron population is controlled at least in part by introduction of control radiation into said electromagnetically reactive cell at a second frequency at or above said bandgap radiation frequency and by movement of photoabsorptively produced electrons in said depletion region toward said interface.

4. The apparatus of claim 3, wherein said positively doped semiconductor layer is in direct contact with said metallic element at said interface.

5. The apparatus of claim 3, said substrate further comprising an insulating layer disposed between said interface of said positively doped semiconductor layer and said metallic element.

6. The apparatus of claim 3, wherein said positively-doped semiconductor layer has a thickness in a range between a first value and a second value, said first value corresponding to a thickness of said depletion region, said second value corresponding to an electron diffusion length within said positively-doped semiconductor layer.

7. The apparatus of claim 6, wherein said thickness of said positively-doped semiconductor layer at least roughly corresponds to an absorption length of said control radiation therein.

8. The apparatus of claim 3, wherein said effective refractive index is temporally controlled between a first value less than zero and a second value greater than zero.

9. The apparatus of claim 3, further comprising:
a signal input receiving said incident electromagnetic radiation for propagation through said composite material;

a modulation input receiving said control radiation for introduction into said electromagnetically reactive cells; and an output device positioned to receive an output signal formed by said incident electromagnetic radiation upon propagation through said composite material as modified according to said modulation input.

10. The apparatus of claim 9, said output device comprising a spatially fixed receiving surface receiving a variable percentage of said incident electromagnetic radiation according to said modulation input, said apparatus forming one of an optical switch, an optical modulator, an optical coupler, and an optical transistor.

11. The apparatus of claim 3, said electromagnetically reactive cells forming a surface receiving the incident electromagnetic radiation, said positively doped semiconductor layers being positioned near said surface, further comprising a modulation input device transferring said control radiation into said positively doped semiconductor layers according to a modulation intensity pattern, said apparatus spatially modulating said incident electromagnetic radiation according to said modulation intensity pattern.

12. A method for controlling propagation of incident electromagnetic radiation, comprising:
placing a composite material in the path of the incident electromagnetic radiation, the composite material comprising resonant cells of small dimension relative to a wavelength of the incident electromagnetic radiation, each resonant cell comprising a metallic element and a substrate; and
temporally controlling an electron population within the substrate near the metallic element of at least one of said resonant cells to temporally control an associated effective refractive index encountered by the incident electromagnetic radiation while propagating through the composite material.

13. The method of claim 12, said substrate comprising a positively doped semiconductor layer having an interface sufficiently close to said metallic element such that a depletion region is formed in association therewith.

14. The method of claim 13, said positively doped semiconductor layer having a bandgap energy and a corresponding bandgap radiation frequency, said wavelength of said incident electromagnetic radiation corresponding to a first frequency below said bandgap radiation frequency, wherein said temporally controlling comprises introducing control radiation into said resonant cell at a second frequency at or above said bandgap radiation frequency, said electron population being affected at least in part by photoabsorptively produced electrons in said depletion region diffusing toward said interface.

15. The method of claim 14, wherein said positively doped semiconductor layer is in direct contact with said metallic element at said interface.

16. The method of claim 14, said substrate further comprising an insulating layer disposed between said interface of said positively doped semiconductor layer and said metallic element.

17. The method of claim 14, wherein said positively-doped semiconductor layer has a thickness in a range between a first value and a second value, said first value corresponding to a thickness of said depletion region, said second value corresponding to an electron diffusion length within said positively-doped semiconductor layer.

18. The method of claim 17, wherein said thickness of said positively-doped semiconductor layer at least roughly corresponds to an absorption length of said control radiation therein.

19. The method of claim 14, wherein said effective refractive index is temporally controlled between a first value less than zero and a second value greater than zero.

20. The method of claim 14, further comprising:
receiving at a signal input said incident electromagnetic radiation for propagation through said composite material;
receiving at a modulation input said control radiation for introduction into said resonant cells; and
receiving at an output device an output signal formed by said incident electromagnetic radiation upon propagation through said composite material as modified according to said modulation input.

21. The method of claim 20, said output device comprising a spatially fixed receiving surface receiving a variable percentage of said incident electromagnetic radiation according to said modulation input, whereby functionality according to one of an optical switch, an optical modulator, an optical coupler, and an optical transistor is achieved.

22. The method of claim 14, said resonant cells forming a surface receiving the incident electromagnetic radiation, said positively doped semiconductor layers being positioned near said surface, further comprising transferring said control radiation into said positively doped semiconductor layers according to a modulation intensity pattern, said resonant cells spatially modulating said incident electromagnetic radiation according to said modulation intensity pattern.

23. An apparatus, comprising:
a composite material comprising an array of electromagnetically reactive cells, each electromagnetically reactive cell comprising a metal conductor disposed on a substrate;
means for applying incident radiation upon a surface of said composite material for propagation therethrough, said incident radiation having a wavelength substantially larger than a size of each of said electromagnetically reactive cells; and
means for temporally controlling an electron population within the substrate near the metal conductor of at least one of said electromagnetically reactive cells to facilitate temporal control of an associated effective refractive index encountered by the incident radiation while propagating through said composite material.

24. The apparatus of claim 23, said substrate comprising a positively doped semiconductor layer having an interface sufficiently close to said metal conductor such that a depletion region is formed in association therewith.

25. The apparatus of claim 24, said positively doped semiconductor layer having a bandgap energy and a corresponding bandgap radiation frequency, said wavelength of said incident electromagnetic radiation corresponding to a first frequency below said bandgap radiation frequency, wherein said means for temporally controlling comprises means for introducing control radiation into said electromagnetically reactive cell at a second frequency at or above said bandgap radiation frequency, said electron population being affected at least in part by photoabsorptively produced electrons in said depletion region diffusing toward said interface.

26. The apparatus of claim 25, wherein said positively doped semiconductor layer is in direct contact with said metal conductor at said interface.

27. The apparatus of claim 25, said substrate further comprising an insulating layer disposed between said interface of said positively doped semiconductor layer and said metal conductor.

28. The apparatus of claim 25, wherein said positively-doped semiconductor layer has a thickness in a range between a first value and a second value, said first value corresponding to a thickness of said depletion region, said second value corresponding to an electron diffusion length within said positively-doped semiconductor layer.

29. The apparatus of claim 28, wherein said thickness of said positively-doped semiconductor layer at least roughly corresponds to an absorption length of said control radiation therein.

30. The apparatus of claim 25, wherein said effective refractive index is temporally controlled between a first value less than zero and a second value greater than zero.

31. The apparatus of claim 25, said positively doped semiconductor layers of said electromagnetically reactive cells being relatively close to said surface of said composite material, further comprising:

means for receiving the control radiation;
means for applying the control radiation to said positively doped semiconductor layers; and
means for receiving an output signal formed by said incident radiation upon propagation through said composite material as modified according to said control radiation.

32. The apparatus of claim 31, said means for receiving an output signal comprising a spatially fixed receiving surface receiving a variable percentage of said incident radiation according to said control radiation, said apparatus forming one of an optical switch, an optical modulator, an optical coupler, and an optical transistor.

33. The apparatus of claim 25, further comprising means for receiving and applying said control radiation onto said positively doped semiconductor layers according to a modulation intensity pattern, said apparatus spatially modulating said incident electromagnetic radiation according to said modulation intensity pattern.

* * * * *

UNITED STATES PATENT AND TRADEMARK OFFICE
CERTIFICATE OF CORRECTION

PATENT NO. : 7,106,494 B2 Page 1 of 1
APPLICATION NO. : 11/035625
DATED : September 12, 2006
INVENTOR(S) : Viatcheslav V. Osipov et al.

It is certified that error appears in the above-identified patent and that said Letters Patent is hereby corrected as shown below:

On the Title page, in field (73), in "Assignee", in column 1, line 2, delete "LP.," and insert -- L.P., --, therefor.

Signed and Sealed this

Sixth Day of April, 2010

David J. Kappos
*Director of the United States Patent and Trademark Office*